United States Patent
Diamond (10) Patent No.: US 11,544,786 B2
(45) Date of Patent: Jan. 3, 2023

(54) SYSTEMS AND METHODS FOR PROVABLY FAIR ATOMIC SWAPS OF PRIVATE DIGITAL ASSETS

(71) Applicant: JPMORGAN CHASE BANK, N.A., New York, NY (US)

(72) Inventor: Benjamin E. Diamond, New York, NY (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 274 days.

(21) Appl. No.: 16/738,554

(22) Filed: Jan. 9, 2020

(65) Prior Publication Data
US 2021/0217084 A1 Jul. 15, 2021

(51) Int. Cl.
  G06Q 40/04 (2012.01)
  H04L 9/32 (2006.01)
  H04L 9/06 (2006.01)

(52) U.S. Cl.
  CPC .......... G06Q 40/04 (2013.01); H04L 9/0643 (2013.01); H04L 9/3218 (2013.01)

(58) Field of Classification Search
  CPC ..... G06Q 40/04; H04L 9/0643; H04L 9/3218; G06F 21/64
  USPC ......................................................... 705/37
  See application file for complete search history.

(56) References Cited

U.S. PATENT DOCUMENTS

| | | | | |
|---|---|---|---|---|
| 2019/0156301 A1* | 5/2019 | Bentov et al. | ......... | G06Q 20/02 20/27 |
| 2019/0164153 A1* | 5/2019 | Agrawal et al. | ....... | G06Q 20/38 20/383 |
| 2020/0020032 A1* | 1/2020 | Bleznak et al. | ....... | G06Q 40/04 40/4 |

FOREIGN PATENT DOCUMENTS

| | | | | |
|---|---|---|---|---|
| GB | WO 2018/224943 A1 | * | 12/2018 | ............. G06F 21/64 |
| GB | WO 2019/180589 A1 | * | 9/2019 | ............... H04L 9/32 |
| WO | 2018224943 | | 12/2018 | |
| WO | 2019092508 | | 5/2019 | |
| WO | WO 2019/092508 A1 | * | 5/2019 | ............. G06Q 30/28 |

(Continued)

OTHER PUBLICATIONS

Luke Fitzpatrick, A Complete Beginner's Guide to Atomic Swaps, Sep. 2, 2019, Forbes, pp. 1-4. (Year: 2019).*
PR Newswire [New York], Apollo Foundation Launches Decentralized Exchange With Atomic Swaps: Apollo DEX beta version includes TradingView, and uses Etherium smart contracts, Oct. 6, 2019, PR Newswire Association LLC. (Year: 2019).*

(Continued)

*Primary Examiner* — Mohammad Z Shaikh
*Assistant Examiner* — George N. Proios
(74) *Attorney, Agent, or Firm* — Greenberg Traurig LLP (57) ABSTRACT

Embodiments may include a two-round-trip protocol by which two parties can securely conduct an already-agreed-upon exchange of digital assets (i.e., in the provable absence of settlement risk). For example, in the first round of the protocol, each party may send to a specially designed "settlement contract" the "statement" corresponding to the party's portion of the proposed bilateral transaction (e.g., how much asset the party will transfer, and to whom), as well as a hash of the party's "proof". Between rounds, each party checks that the other party's statement transfers to the party the agreed-upon amount. The settlement contract may then lock the proof hashes against future misuse, and in particular against use by unauthorized parties. In the second round, each party sends its proof to the settlement contract. The settlement contract then dispatches both statement-proof pairs and executes the bilateral exchange.

18 Claims, 2 Drawing Sheets

(56) References Cited

FOREIGN PATENT DOCUMENTS

WO        2019180589         9/2019

OTHER PUBLICATIONS

Runchao Han et al., On the optionality and fairness of Atomic Swaps, Oct. 21, 2019, Association for Computing Machinery, Inc., AFT 2019—Proceedings of the 1st ACM Conference on Advances in Financial Technologies, pp. 62-75. (Year: 2019).*
Luis Aureliano, Cross-Chain Trading Looks to Make Cryto More Attractive to Wall Street, Here's Who's Leading the Charge, Feb. 22, 2018, Accretive Capital LLC d/b/a Benzinga. (Year: 2018).*
Ron van der Meyden, On the specification and verification of atomic swap smart contracts, 2018, arXiv:1811.06099. (Year: 2018).*
Dan Robinson, HTLCs Considered Harmful, 2019, https : / / cyber. stanford . edu / sites / g / files /sbiybj9936 / f / htlcs_considered_ harmful.pdf. (Year: 2019).*
Ruozhou Yu et al., CoinExpress: A Fast PaymentRouting Mechanism in Blockchain-based Payment Channel Networks, Jul. 1, 2018, IEEE Conferences, 2018 27th International Conference on Computer Communication and Networks (ICCCN), pp. 1-9. (Year: 2018).*
International Search Report, dated Jun. 7, 2021, from corresponding International Application No. PCT/US2021/012800.
Written Opinion of the International Searching Authority, dated Jun. 7, 2021, from corresponding International Application No. PCT/US2021/012800.

* cited by examiner

SYSTEMS AND METHODS FOR PROVABLY FAIR ATOMIC SWAPS OF PRIVATE DIGITAL ASSETS

BACKGROUND OF THE INVENTION

1. Field of the Invention

Embodiments generally relate to systems and methods for provably fair atomic swaps of private digital assets.

2. Description of the Related Art

Most digital payment schemes (e.g., Bitcoin and Zcash) instantiate just a single digital asset. Ethereum, in contrast, facilitates the simultaneous coexistence of multiple digital assets. Usually, these assets are represented by (non-private) ERC20-compliant contracts; such assets can be readily exchanged with recourse to a technique which uses "smart contracts" as incorruptible escrow agents. Yet when assets are protected by zero-knowledge cryptography—or, more generally, in settings where smart contracts can't unilaterally effect transfers—orchestrating "fair" bilateral exchanges of assets becomes a serious difficulty. "Fairness" in the sense used here, assures to two parties that either both among a pair of planned trades will be executed (e.g., based on some previously agreed-upon terms) or neither planned trade will execute. This can be understood as a provable elimination of settlement risk.

Standard (i.e., non-private) ERC-20 assets present no difficulty with regard to fair exchanges, as users may authorize contracts to effect transfers on their behalf. After having so authorized a "settlement" contract to transfer on its behalf, each among the two parties to a desired trade may submit an Ethereum signature over a message which authorizes the unilateral transfer and also includes all other aspects of the bilateral exchange (i.e., including the counterparty's amount). Such signatures are not transferrable to other swaps, and the authorizations they tacitly provide can't be extracted or replayed in other settings.

This approach necessarily fails for assets that are cryptographically private, or which (more generally) do not accept Ethereum signatures. For example, consider a setting in which assets can be spent by their owners only with recourse to an authentication mechanism of a special form—one which, in particular, differs from that used natively by the Ethereum universe (and in which contracts can't participate). In this latter setting, contracts cannot serve as escrow agents, and both "signed checks" must be publicly published (in some order) before they can be "cashed." Absent special measures, this may subject both parties to settlement risk.

SUMMARY OF THE INVENTION

Systems, methods, and devices for provably fair atomic swaps of private digital assets are disclosed. In one embodiment, in a distributed ledger network, a method for provably fair atomic swaps of private digital assets may include a settlement contract performing the following: (1) defining a data structure comprising a first party field and a second party field on the distributed ledger, each field configured to store at least an asset type, a statement, and a proof; (2) receiving, from a first temporary address for a first party to an exchange, an identifier, the first party's asset type, the first party's statement representing its side of the exchange, and a hash of the first party's proof; (3) receiving, from a second temporary address for a second party to the exchange, the identifier, the second party's asset type, the second party's statement representing its side of the exchange, and a hash of the second party's proof; (4) locking the hash of the first party's proof against the first temporary address on the distributed ledger; (5) locking the hash of the second party's proof against the second temporary address on the distributed ledger; (6) writing the first party's asset type and the first party's statement in the first party field, and the second party's asset type and the second party's statement in the second party field; (7) receiving, from the first party, the identifier and the first party's proof; (8) receiving, from the second party, the identifier and the second party's proof; (9) hashing the first party's proof and retrieving a first retrieved temporary address associated with the hash of the first party's proof; (10) verifying that the first retrieved temporary address matches the first temporary address and populating the first party field with the first party's proof; (11) hashing the second party's proof and retrieving a second retrieved temporary address associated with the hash of the second party's proof; (12) verifying that the second retrieved temporary address matches the second temporary address and populating the second party field with the second party's proof; and (13) sending the first party's statement representing its side of the exchange and the first party's proof, and the second party's statement representing its side of the exchange and the second party's proof for execution.

In one embodiment, the settlement contract may be an Ethereum settlement contract.

In one embodiment, the steps of receiving, from the first temporary address for a first party to an exchange, the identifier, the first party's asset type, the first party's statement representing its unilateral transfer, and the hash of the first party's proof and receiving, from the second temporary address for a second party to the exchange, the identifier, the second party's asset type, the second party's statement representing its unilateral transfer, and the hash of the second party's proof occur in any order.

In one embodiment, the steps of receiving, from the first party, the identifier and the first party's proof and receiving, from the second party, the identifier and the second party's proof occur in any order.

In one embodiment, the asset type may include an Anonymous Zether contract address.

In one embodiment, the first party may compare the second party's asset type and the second party's statement to the second party's asset type and an amount in an initial agreement before sending the identifier and the first party's proof.

In one embodiment, the second party may compare the first party's asset type and the first party's statement to the first party's asset type and an amount in an initial agreement before sending the identifier and the second party's proof.

In one embodiment, the method may further include deleting the first temporary address and the second temporary address.

In one embodiment, the first party and the second party may agree to the exchange in a separate communication.

According to another embodiment, a system for provably fair atomic swaps of private digital assets may include a distributed ledger network comprising a node associated with a first party and a second node associated with a second party, the first party and the second party being parties to an exchange, and a settlement contract defining a data structure comprising a first party field and a second party field, each field configured to store at least an asset type, a statement, and a proof, deployed to the first node and the second node of the distributed ledger. The settlement contract may: receive at the first node and from a first temporary address for the first party, an identifier, the first party's asset type, the first party's statement representing its side of the exchange, and a hash of the first party's proof; receive at the second node and from a second temporary address, the identifier, the second party's asset type, the second party's statement representing its side of the exchange, and a hash of the second party's proof; lock the hash of the first party's proof against the first temporary address on the distributed ledger; lock the hash of the second party's proof against the second temporary address on the distributed ledger, write the first party's asset type and the first party's statement in the first party field, and the second party's asset type and the second party's statement in the second party field; receive, from the first node and from the party, the identifier and the first party's proof; receive, from the second node and from the second party, the identifier and the second party's proof; hash the first party's proof and retrieving a first retrieved temporary address associated with the hash of the first party's proof; verify that the first retrieved temporary address matches the first temporary address and populating the first party field with the first party's proof; hash the second party's proof and retrieving a second retrieved temporary address associated with the hash of the second party's proof; verify that the second retrieved temporary address matches the second temporary address and populating the second party field with the second party's proof; and send the first party's statement representing its side of the exchange and the first party's proof, and the second party's statement representing its side of the exchange and the second party's proof for execution.

In one embodiment, the settlement contract may be an Ethereum settlement contract.

In one embodiment, the receipt of the first temporary address for a first party to an exchange, the identifier, the first party's asset type, the first party's statement representing its unilateral transfer, and the hash of the first party's proof from the first party and the receipt of the identifier, the second party's asset type, the second party's representing its unilateral transfer, and the hash of the second party's proof from the second party may occur in any order.

In one embodiment, the receipt of the identifier and the first party's proof from the first party and the receipt of the identifier and the second party's proof from the second party may occur in any order.

In one embodiment, the asset type may include an Anonymous Zether contract address.

In one embodiment, the first party may compare the second party's asset type and the second party's statement to the second party's asset type and an amount in an initial agreement before sending the identifier and the first party's proof.

In one embodiment, the second party may compare the first party's asset type and the first party's statement to the first party's asset type and an amount in an initial agreement before sending the identifier and the second party's proof.

In one embodiment, the settlement contract may delete the first temporary address and the second temporary address.

In one embodiment, the first party and the second party may agree to the exchange in a separate communication.

BRIEF DESCRIPTION OF THE DRAWINGS

In order to facilitate a fuller understanding of the present invention, reference is now made to the attached drawings in which.

DETAILED DESCRIPTION OF PREFERRED EMBODIMENTS

Embodiments are directed to systems and methods for provably fair atomic swaps of private digital assets.

Although embodiments are disclosed in the context of privacy-preserving digital assets, such as those instantiated by Anonymous Zether contracts, it should be recognized that they are not so limited, and may be used with other digital assets (e.g., arbitrary digital assets) and contract types as is necessary and/or desired.

Embodiments may include a two-round-trip protocol by which two parties can securely conduct an already-agreed-upon exchange of digital assets (i.e., in the provable absence of settlement risk). For example, in the first round of the protocol, each party may send to a specially designed "settlement contract" the "statement" corresponding to the party's portion of the proposed bilateral transaction (e.g., how much asset the party will transfer, and to whom), as well as a hash of the party's "proof". In the setting of cryptographically private digital assets, a "statement" is a blob of cryptographic data which summarizes, in encrypted form, the nature of a proposed unilateral transfer, whereas a "proof", among other things, authorizes in a privacy-preserving manner the execution of the statement.

Between rounds, each party checks that the other party's statement transfers to the party the agreed-upon amount.

The settlement contract may then lock the proof hashes against future misuse, and in particular against use by unauthorized parties.

In the second round, each party sends its proof to the settlement contract. The settlement contract then dispatches both statement—proof pairs and executes the transaction.

For example, if Alice were to send both her statement and proof at the same time, then Bob could respond with a statement and proof that transferred to her less than the agreed-upon amount. The revelation of Alice's proof only in the second round—i.e., after she has checked Bob's terms—prevents this attack. It remains possible, however, that Bob could abandon the second round, and maliciously re-use Alice's statement and proof in some future swap. The "proof hash locking" technique ensures that only an Alice-owned Ethereum account can ever use Alice's proof hash and prevents this latter attack.

Figure 1:
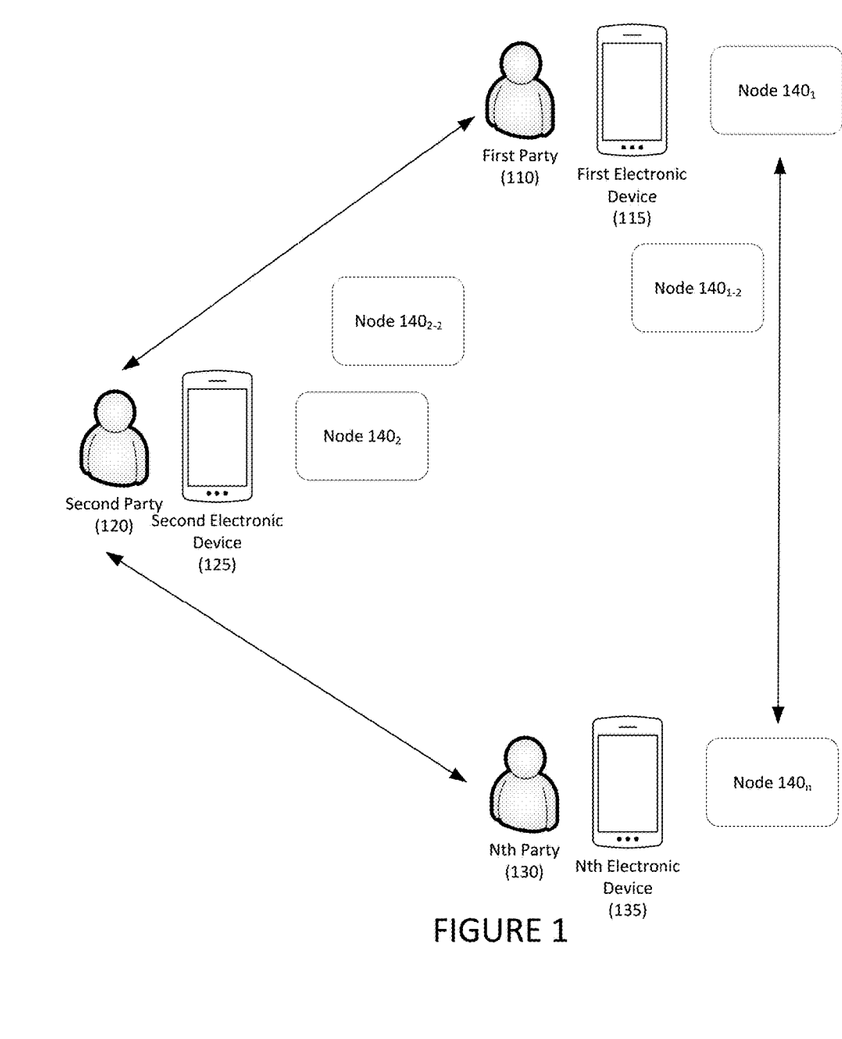
FIG. 1 discloses system for provably fair atomic swaps of private digital assets according to one embodiment.

Referring to FIG. 1, a system for provably fair atomic swaps of digital assets is disclosed according to one embodiment. System 100 may include a plurality of parties (e.g., first party 110, second party 120, nth party 130, etc.) and a backend (e.g., backend 150). Each party 110, 120, 130, may be associated with a node (e.g., $140_1$, $140_2$, $140_n$) in a distributed ledger network.

Parties to a transaction (e.g., first party 110 and second party 120) may use temporary accounts $140_{1-2}$ and $140_{2-2}$.

The distributed ledger may host a distributed settlement contract (not shown) which may facilitate provably fair atomic swaps of digital assets.

Figure 2:
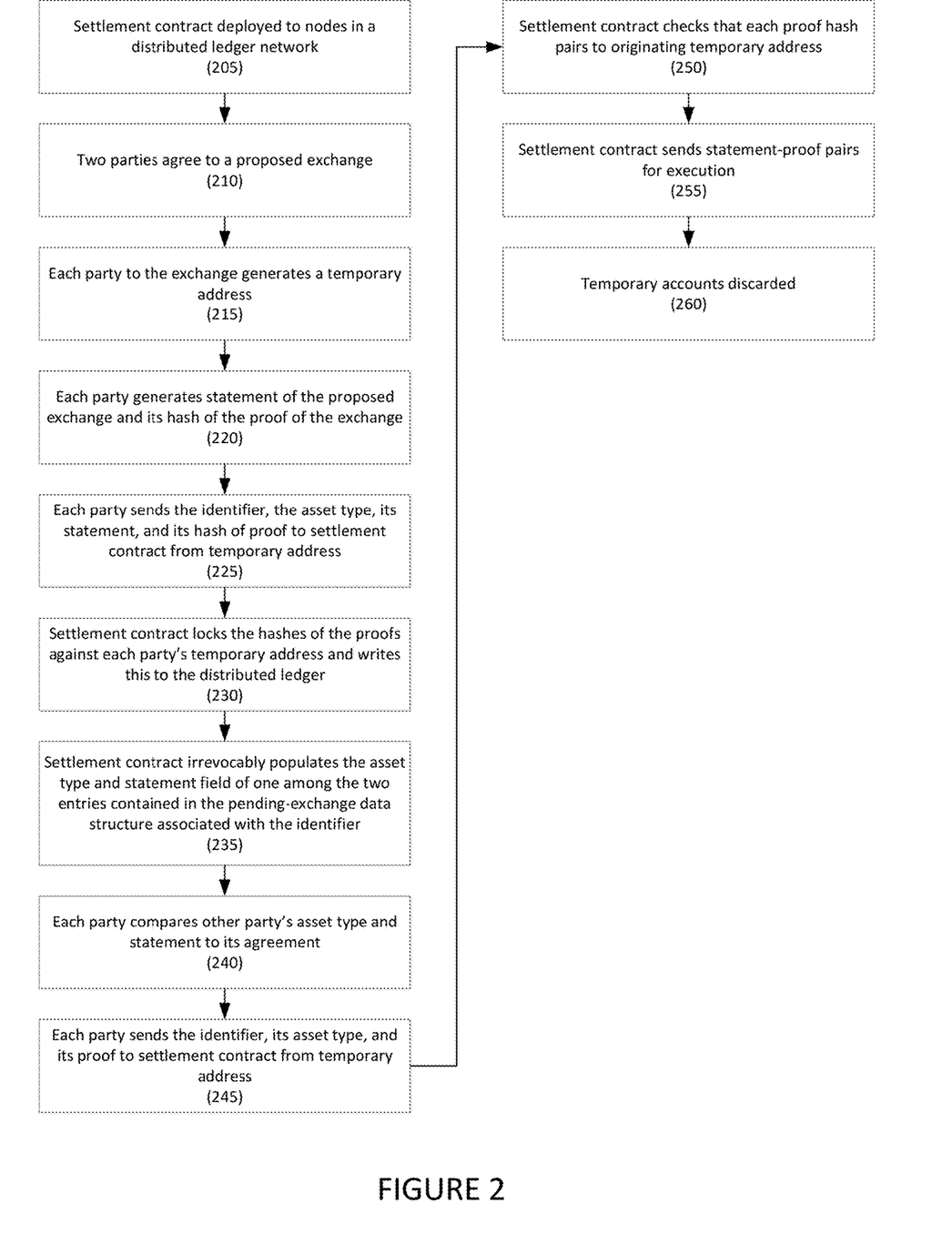
FIG. 2 discloses a method for provably fair atomic swaps of private digital assets according to one embodiment.

Referring to FIG. 2, a method for provably fair atomic swaps of digital assets is disclosed according to one embodiment.

In step 205, an Ethereum or similar settlement contract may be deployed among the nodes of a distributed ledger network. This deployment may need to be done only once for each network. Anonymous Zether contracts representing various digital assets have already been deployed to the network.

This settlement contract defines a particular type of abstract data structure designed to store information pertaining to the exchange. This data structure features two main fields, one for each "leg" of a proposed bilateral exchange; in each such field, it allows an asset type (given, for example, by an Anonymous Zether contract address), a statement, and a proof to be stored.

In one embodiment, the settlement contract establishes two global databases, or mappings, that it maintains throughout its lifetime. Both are keyed by digest-sized data blobs (e.g., 32-byte strings). The first data database admits values of type given by the data type described above, i.e., by "pending swap" structs. The second database admits values of type "Ethereum address."

In step 210, two parties may agree to the terms of an exchange, and may agree on a unique identifier for this exchange. In one embodiment, the parties may agree in any suitable manner, such as in-person, electronically over a network, directly, indirectly, etc.

In one embodiment, as part of the agreement, a unique identifier may be generated for the exchange and provided to the parties. In one embodiment, the unique identifier may be generated by the interface by which the parties reached agreement; any other suitable manner of generating and providing the unique identifier may be used as is necessary and/or desired.

In step 215, each party to the exchange may generate a temporary address. In one embodiment, the temporary addresses may be used only for the specific exchange, and later (i.e., after the swap is complete) are discarded or otherwise disabled.

In step 220, each party to the exchange may generate a statement and a proof corresponding to its "leg" of the exchange. The proof authorizes the unilateral exchange defined by the statement and proves that it complies with the rules (while simultaneously keeping its attributes private). An example is provided in U.S. Provisional Patent Application Ser. No. 62/830,969 the disclosure of which is hereby incorporated, by reference, in its entirety.

In step 225, each party may send the identifier, the asset type (e.g., an Anonymous Zether contract address, etc.), its statement (e.g., encrypted terms of its part of the exchange), and its hash of the proof to the settlement contract using the temporary address.

In step 230, the settlement contract may lock the hash of the proof from each party against the party's temporary address. Because of the hash function's assumed collision-resistance, this implicitly locks the proofs as well.

In one embodiment, the settlement contract may add an entry to its internal database whose values are of the type "Ethereum addresses." Namely, given the claimed proof hash, the contract stores—in the entry whose key is given by the claimed proof hash—a value given by the (temporary) address on behalf of which the sender submitted the data (denoted in Ethereum by "msg.sender"). The effect of this new data entry will be made clear below. It may ensure that this field cannot be subsequently overwritten by any future Ethereum transaction.

In one embodiment, the database entry may be a temporary database entry.

In step 235, the settlement contract may irrevocably populate the asset type and statement field of one of the two entries of the pending exchange data structure associated with the identifier. In particular, it may retrieve the pending swap data structure residing at the database entry whose key is given by the supplied unique identifier. If no such value exists, the contract creates a fresh one. Given the value, it selects an empty entry among the struct's two "legs" and populates the asset type and statement fields of this entry, using the values supplied by the sender.

In one embodiment, the database entry may be a temporary database entry.

As described above, steps 220, 225, and 230 are performed twice—once for each party to the exchange. For the parties, these steps may be performed asynchronously. For example, the parties may send the information to the settlement contract, and the settlement contract may take its actions, in any suitable order. There is no requirement that either party make its submission before the other, or that the settlement contract process either party's submissions in a particular order.

In step 240, each party may compare the other's asset type and statement to the asset type and amount the other party had previously agreed to pay, as per the initial agreement. For example, each party may compare the other party's statement written to the distributed ledger in step 230 to the exchange agreed to in step 210.

In step 245, each party may send the identifier, its asset type, and its proof to the settlement contract from the temporary address. This may be the same proof for the hash provided by the parties in step 225.

In one embodiment, the identifier, asset type, and proof may be sent after each party is found to have submitted a statement which it proposes to transfer the agreed-upon amount of the correct asset.

In step 250, the settlement contract may hash each proof that it receives in step 245. The settlement contract will then retrieve the value, in its internal database whose values are of type "Ethereum address," residing in the entry whose key is given by the hash it just computed. This value's type is an Ethereum address. It will then compare the value it retrieved from its database to the address on behalf of which the proof was just submitted. If the addresses are identical, the settlement contract will populate the proof field (of the appropriate entry) of the pending swap data structure whose key is given by the supplied unique identifier with the proof just sent. Otherwise, it will return without action.

Note that, similar to steps 220, 225, and 230, steps 240, 245, and 250 occur twice and are asynchronous. Thus, the order in which each party compares the statements and submits the identifier and its proof, and the settlement contract verifies the proofs, does not matter.

In step 255, the settlement contract sends both statement—proof pairs to the appropriate Anonymous Zether contracts for execution of the exchange. If either of these fail (e.g., the proof fails to verify) neither part of the exchange will be executed as per the basic properties of the Ethereum platform.

In step 260, after both statement-proof pairs execute, the settlement contract may delete the pending exchange entry in its internal database residing at the entry keyed by the exchange's unique identifier. Similarly, it may delete both temporary Ethereum addresses from its second internal database.

The disclosure of U.S. Provisional Patent Application Ser. Nos. 62/830,969 and 62/847,153 are hereby incorporated, by reference, in their entireties.

Hereinafter, general aspects of implementation of the systems and methods of embodiments will be described.

Embodiments of the system or portions of the system may be in the form of a "processing machine," such as a general-purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above. Such a set of instructions for performing a particular task may be characterized as a program, software program, or simply software.

In one embodiment, the processing machine may be a specialized processor.

As noted above, the processing machine executes the instructions that are stored in the memory or memories to process data. This processing of data may be in response to commands by a user or users of the processing machine, in response to previous processing, in response to a request by another processing machine and/or any other input, for example.

As noted above, the processing machine used to implement embodiments may be a general-purpose computer. However, the processing machine described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the processes disclosed herein.

The processing machine used to implement embodiments may utilize a suitable operating system. Thus, embodiments may include a processing machine running the iOS operating system, the OS X operating system, the Android operating system, the Microsoft Windows™ operating systems, the Unix operating system, the Linux operating system, the Xenix operating system, the IBM AIX™ operating system, the Hewlett-Packard UX™ operating system, the Novell Netware™ operating system, the Sun Microsystems Solaris™ operating system, the OS/2™ operating system, the BeOS™ operating system, the Macintosh operating system, the Apache operating system, an OpenStep™ operating system or another operating system or platform.

It is appreciated that in order to practice the method of the embodiments as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above, in accordance with a further embodiment, may be performed by a single component. Further, the processing performed by one distinct component as described above may be performed by two distinct components.

In a similar manner, the memory storage performed by two distinct memory portions as described above, in accordance with a further embodiment, may be performed by a single memory portion. Further, the memory storage performed by one distinct memory portion as described above may be performed by two memory portions.

Further, various technologies may be used to provide communication between the various processors and/or memories, as well as to allow the processors and/or the memories to communicate with any other entity; i.e., so as to obtain further instructions or to access and use remote memory stores, for example. Such technologies used to provide such communication might include a network, the Internet, Intranet, Extranet, LAN, an Ethernet, wireless communication via cell tower or satellite, or any client server system that provides communication, for example. Such communications technologies may use any suitable protocol such as TCP/IP, UDP, or OSI, for example.

As described above, a set of instructions may be used in the processing of embodiments. The set of instructions may be in the form of a program or software. The software may be in the form of system software or application software, for example. The software might also be in the form of a collection of separate programs, a program module within a larger program, or a portion of a program module, for example. The software used might also include modular programming in the form of object oriented programming. The software tells the processing machine what to do with the data being processed.

Further, it is appreciated that the instructions or set of instructions used in the implementation and operation of embodiments may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments. Illustratively, the programming language used may include assembly language, Ada, APL, Basic, C, C++, COBOL, dBase, Forth, Fortran, Java, Modula-2, Pascal, Prolog, REXX, Visual Basic, and/or JavaScript, for example. Further, it is not necessary that a single type of instruction or single programming language be utilized in conjunction with the operation of the system and method. Rather, any number of different programming languages may be utilized as is necessary and/or desired.

Also, the instructions and/or data used in the practice of embodiments may utilize any compression or encryption technique or algorithm, as may be desired. An encryption module might be used to encrypt data. Further, files or other data may be decrypted using a suitable decryption module, for example.

As described above, the embodiments may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in embodiments may take on any of a variety of physical forms or transmissions, for example. Illustratively, the medium may be in the form of paper, paper transparencies, a compact disk, a DVD, an integrated circuit, a hard disk, a floppy disk, an optical disk, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by the processors.

Further, the memory or memories used in the processing machine that implements embodiments may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the systems and methods, a variety of "user interfaces" may be utilized to allow a user to interface with the processing machine or machines that are used to implement embodiments. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, keypad, voice reader, voice recognizer, dialogue screen, menu box, list, checkbox, toggle switch, a pushbutton or any other device that allows a user to receive information regarding the operation of the processing machine as it processes a set of instructions and/or provides the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method, it is not necessary that a human user actually interact with a user interface used by the processing machine. Rather, it is also contemplated that the user interface might interact, i.e., convey and receive information, with another processing machine, rather than a human user. Accordingly, the other processing machine might be characterized as a user. Further, it is contemplated that a user interface utilized in the system and method may interact partially with another processing machine or processing machines, while also interacting partially with a human user.

It will be readily understood by those persons skilled in the art that embodiments are susceptible to broad utility and application. Many embodiments and adaptations of the present invention other than those herein described, as well as many variations, modifications and equivalent arrangements, will be apparent from or reasonably suggested by the foregoing description thereof, without departing from the substance or scope.

Accordingly, while embodiments present invention has been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications or equivalent arrangements.

What is claimed is:

1. A method for provably fair atomic swaps of private digital assets, comprising:

in a distributed ledger network, comprising a distributed ledger, a settlement contract performing the following:

defining a data structure comprising a first party field and a second party field on the distributed ledger, each field configured to store at least an asset type, a statement, and a proof;

receiving, at a first node associated with a first party and from a first temporary address for the first party to an exchange, an identifier, the first party's asset type, the first party's statement representing its side of the exchange, and a hash of the first party's proof;

receiving, at a second node associated with a second party and from a second temporary address for the second party to the exchange, the identifier, the second party's asset type, the second party's statement representing its side of the exchange, and a hash of the second party's proof;

locking the hash of the first party's proof against the first temporary address on the distributed ledger;

locking the hash of the second party's proof against the second temporary address on the distributed ledger;

writing the first party's asset type and the first party's statement in the first party field, and the second party's asset type and the second party's statement in the second party field;

receiving, from the first node and from the first party, the identifier and the first party's proof;

receiving, from the second node and from the second party, the identifier and the second party's proof;

hashing the first party's proof and retrieving a first retrieved temporary address associated with the hash of the first party's proof;

verifying that the first retrieved temporary address matches the first temporary address and populating the first party field with the first party's proof;

hashing the second party's proof and retrieving a second retrieved temporary address associated with the hash of the second party's proof;

verifying that the second retrieved temporary address matches the second temporary address and populating the second party field with the second party's proof; and sending the first party's statement representing its side of the exchange and the first party's proof, and the second party's statement representing its side of the exchange and the second party's proof for execution;

wherein the first temporary address and the second temporary address are specific to the exchange and are discarded or disabled following execution of the exchange.

2. The method of claim 1, wherein the settlement contract is an Ethereum settlement contract.

3. The method of claim 1, wherein the steps of receiving, from the first temporary address for a first party to an exchange, the identifier, the first party's asset type, the first party's statement representing its side of the exchange, and the hash of the first party's proof and receiving, from the second temporary address for a second party to the exchange, the identifier, the second party's asset type, the second party's statement representing its side of the exchange, and the hash of the second party's proof occur in any order.

4. The method of claim 1, wherein the steps of receiving, from the first party, the identifier and the first party's proof and receiving, from the second party, the identifier and the second party's proof occur in any order.

5. The method of claim 1, wherein the asset type comprises an Anonymous Zether contract address.

6. The method of claim 1, wherein the first party compares the second party's asset type and the second party's statement to the second party's asset type and an amount in an initial agreement before sending the identifier and the first party's proof.

7. The method of claim 1, wherein the second party compares the first party's asset type and the first party's statement to the first party's asset type and an amount in an initial agreement before the identifier and the second party's proof.

8. The method of claim 1, wherein the first party and the second party agree to the exchange in a separate communication.

9. The method of claim 1, wherein the first temporary address and the second temporary address are Ethereum addresses.

10. A system for provably fair atomic swaps of private digital assets, comprising:

a distributed ledger network comprising a distributed ledger and a first node associated with a first party and a second node associated with a second party, the first party and the second party being parties to an exchange;

a settlement contract defining a data structure comprising a first party field and a second party field, each field configured to store at least an asset type, a statement, and a proof, deployed to the first node and the second node of the distributed ledger;

wherein the settlement contract:

receives at the first node and from a first temporary address for the first party, an identifier, the first party's asset type, the first party's statement representing its side of the exchange, and a hash of the first party's proof;

receives at the second node and from a second temporary address, the identifier, the second party's asset type, the second party's statement representing its side of the exchange, and a hash of the second party's proof;

locks the hash of the first party's proof against the first temporary address on the distributed ledger;

locks the hash of the second party's proof against the second temporary address on the distributed ledger;

writes the first party's asset type and the first party's statement in the first party field, and the second party's asset type and the second party's statement in the second party field;

receives, from the first node and from the party, the identifier and the first party's proof;

receives, from the second node and from the second party, the identifier and the second party's proof;

hashes the first party's proof and retrieving a first retrieved temporary address associated with the hash of the first party's proof;

verifies that the first retrieved temporary address matches the first temporary address and populating the first party field with the first party's proof;

hashes the second party's proof and retrieving a second retrieved temporary address associated with the hash of the second party's proof;

verifies that the second retrieved temporary address matches the second temporary address and populating the second party field with the second party's proof; and sends the first party's statement representing its side of the exchange and the first party's proof, and the second party's statement representing its side of the exchange and the second party's proof for execution;

wherein the first temporary address and the second temporary address are specific to the exchange and are discarded or disabled following execution of the exchange.

11. The system of claim 10, wherein the settlement contract is an Ethereum settlement contract.

12. The system of claim 10, wherein the receipt of the first temporary address for a first party to an exchange, the identifier, the first party's asset type, the first party's statement representing its side of the exchange, and the hash of the first party's proof from the first party and the receipt of the identifier, the second party's asset type, the second party's statement representing its side of the exchange, and the hash of the second party's proof from the second party occur in any order.

13. The system of claim 10, wherein the receipt of the identifier and the first party's proof from the first party and the receipt of the identifier and the second party's proof from the second party occur in any order.

14. The system of claim 10, wherein the asset type comprises an Anonymous Zether contract address.

15. The system of claim 10, wherein the first party compares the second party's asset type and the second party's statement to the second party's asset type and an amount in an initial agreement before sending the identifier and the first party's proof.

16. The system of claim 10, wherein the second party compares the first party's asset type and the first party's statement to the first party's asset type and an amount in an initial agreement before the identifier and the second party's proof.

17. The system of claim 10, wherein the first party and the second party agree to the exchange in a separate communication.

18. The system of claim 10, wherein the first temporary address and the second temporary address are Ethereum addresses.

\* \* \* \* \*